United States Patent
Yamanaka

[11] Patent Number: 5,835,283
[45] Date of Patent: Nov. 10, 1998

[54] CONDENSER LENS FOR OPTICAL DISKS

[75] Inventor: Yutaka Yamanaka, Tokyo, Japan

[73] Assignee: NEC Corporation, Tokyo, Japan

[21] Appl. No.: 782,931

[22] Filed: Jan. 13, 1997

[30] Foreign Application Priority Data

Jan. 19, 1996 [JP] Japan .................................. 8-007083

[51] Int. Cl.$^6$ .............................. G02B 3/02; G02B 3/10; G11B 7/00
[52] U.S. Cl. ...................... 359/719; 359/721; 369/44.23; 369/112
[58] Field of Search ..................................... 359/719, 742, 359/743, 721, 710, 708; 369/44.14, 44.23, 112; 353/38, 102

[56] References Cited

U.S. PATENT DOCUMENTS

| | | | |
|---|---|---|---|
| 5,161,040 | 11/1992 | Yokoyama et al. ...................... | 359/742 |
| 5,703,862 | 12/1997 | Lee et al. ............................... | 369/44.23 |
| 5,764,603 | 6/1998 | Glaser-Inbari ......................... | 369/44.23 |

FOREIGN PATENT DOCUMENTS

| | | |
|---|---|---|
| 0 457 553 A2 | 11/1991 | European Pat. Off. . |
| 0 610 055 A2 | 8/1994 | European Pat. Off. . |
| 0731 458 A1 | 8/1996 | European Pat. Off. . |
| 0766 238 A1 | 4/1997 | European Pat. Off. . |
| 63-285502 | 11/1988 | Japan . |
| 6215406 | 8/1994 | Japan . |

OTHER PUBLICATIONS

Yoshiaki Komma, et al. "Dual Focus Optical Head for 0.6mm and 1.2mm Disks", Optical Data Storage, vol. 2338, 1994, pp. 282–288.

Y. Komma et al.; "Dual Focus Optical Head for 0.6mm and 1.2mm Disks"; Optical Review, vol. 1, No. 1 (1994), pp. 27–29.

*Primary Examiner*—Georgia Y. Epps
*Assistant Examiner*—Jordan M. Schwartz
*Attorney, Agent, or Firm*—Whitham, Curtis & Whitham

[57] ABSTRACT

A condenser lens to be used for an optical head capable of recording or reading information on or from optical disks having different substrate thicknesses in an optical disk device such as a CD or the like. A light beam emitted from a laser light source is focused by a condenser lens to form a minute spot. The incident surface of the condenser lens is divided into a plurality of division areas which are sufficiently small with respect to the lens opening. The division areas constitute first and second lens surfaces, that is, parts of lens surfaces of two different lenses. The light beam is focused by the first lens surface to form a minute spot on a first optical disk and by the second lens surface to from a minute spot on a second optical disk. The two lenses can be optimized independently and be designed readily. One condenser lens having the first and second lens surfaces can form two kinds of light beam spots and adaptable to two optical disks having different substrate thicknesses.

2 Claims, 3 Drawing Sheets

CONDENSER LENS FOR OPTICAL DISKS

BACKGROUND OF THE INVENTION

The present invention relates to a condenser lens to be used for an optical head capable of recording or reading information to or from optical disk media having different substrate thicknesses in an optical disk device such as CDs or the like.

DESCRIPTION OF THE RELATED ART

In a conventional optical disk device generally used, in order to protect a surface of a recording medium of a micron order, a minute light spot is formed on the surface of the recording medium through a transparent substrate in an optical head.

In such an optical head configuration, a focusing beam passes through a transparent substrate as a parallel flat plate, and a wave aberration is caused in the passing beam depending on the thickness of the parallel flat plate. This wave aberration shows a deviation from a spherical surface of an equiphase surface of a focusing beam. If this deviation is large, the focused spot is expanded beyond the diffraction limit, and good recording or reproducing characteristics cannot be accomplished. Hence, in order to produce a minute spot near the diffraction limit on the recording medium, the lens is designed so as to correct this wave aberration in an optical system of the optical head.

A substrate thickness of an optical disk is different for purposes for use. A difference in the substrate thickness brings about a difference in the correction amount of the wave aberration, and a conventional optical head can record or read the information on or from the optical disk having a certain thickness only.

A dual focus optical head adaptable to optical disks having two different substrate thicknesses using the zero order light and the first order diffracted light of a holographic optical element has been proposed by Y. Komma et al., as disclosed in *Optical Review* Vol. 1, No. 1 pp 27–29, 1994.

In this optical head, as shown in FIG. 1, a condenser lens 3 is designed adaptable to a first optical disk 6 having a thin substrate thickness, and the information stored on the optical disk can be read using the zero order light of a holographic optical element 2 with no phase variation. On the other hand, to deal with a second optical disk 7 having a thick substrate thickness, the holographic element 2 has gratings which are designed to generate the first order diffracted light to correct spherical aberrations caused by the differences in thickness of two optical disks. The grating shape of the holographic optical element can be determined by the interference between the wave surfaces of the incoming and outgoing lights at the hologram surface position.

In this holographic optical element in use, first order diffracted light is unnecessary, and the cross section of the gratings is brought close to saw teeth shape of the blazed gratings so as to control the generation of the − first order diffracted light to improve the efficiency of the (+) first order diffracted light.

Such gratings can be produced by forming a staircase relief using many times of an etching process or by cutting a metal surface using a precise tool or bite. However, there is a limitation in the pitch of the gratings when manufacturing. In general, approximately ten to several tens microns are the limitation of the pitch for preparing the gratings with good reproducibility. In the foregoing example, the minimum pitch is 13.5 microns.

As described above, it is readily understood that the aberration to be corrected by the holographic optical element is restricted in practice in manufacturing.

SUMMARY OF THE INVENTION

It is an object of the present invention to provide a condenser lens for an optical disk in view of the aforementioned problems of the prior art, which is capable of being adaptable to two kinds of optical disks without limiting any pitch of diffraction gratings.

In accordance with one aspect of the present invention, there is provided a condenser lens for optical disks for focusing a light beam emitted from a laser light source to form a minute spot, comprising a plurality of division areas which are formed on one lens surface by dividing one lens surface area and are sufficiently small with respect to a lens opening, the division areas constituting parts of one of two different lenses.

In a condenser lens, preferably, the division areas are produced in a concentric circle form around a center of the lens or in a striped pattern.

Further, the division areas are produced with a nonconstant pitch.

Moreover, the division areas are preferably produced in a radial pattern.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
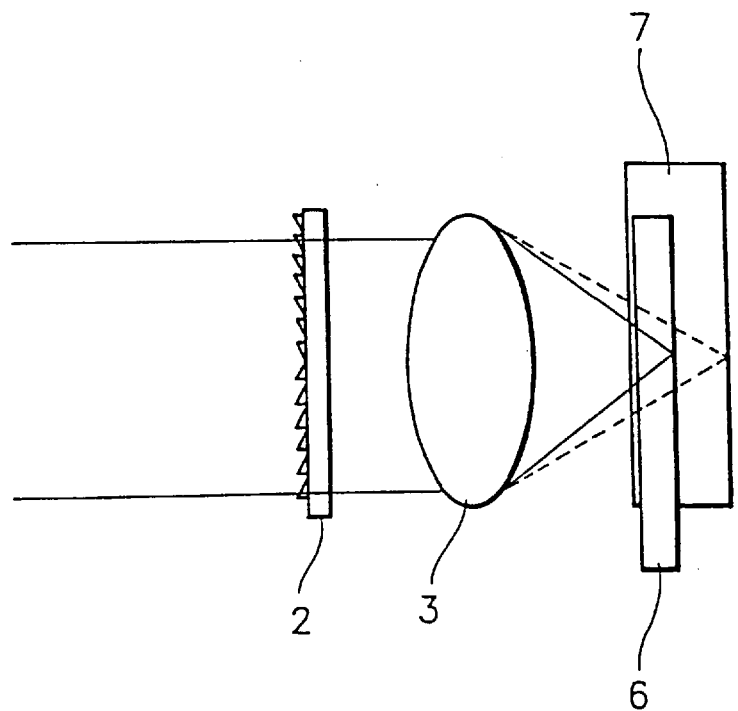
FIG. 1 is a schematic cross section of a condenser lens of a conventional optical disk.
Figure 2:
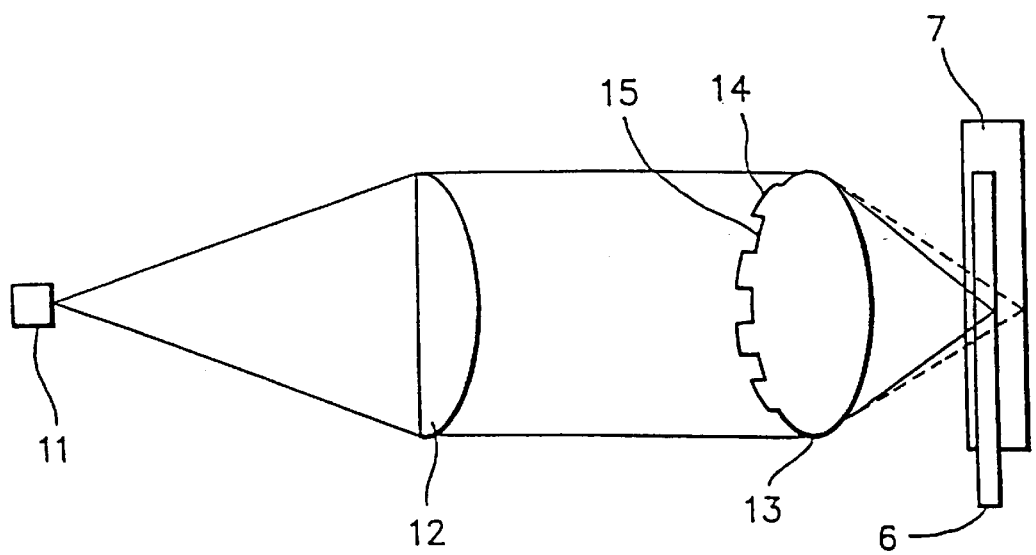
FIG. 2 is a schematic cross section of a condenser lens of an optical disk according to a first embodiment of the present invention.

Referring now to the drawings, there is shown in FIG. 2 a condenser lens for an optical disk according to a first embodiment of the present invention.

In FIG. 2, a light beam emitted fro m a laser light source 11 is collimated by a collimating lens 12, and the collimated light beam is focused by a condenser lens 13 to form a minute spot.

The condenser lens 13 is an area split lens whose incident surface is divided into a plurality of sub-surfaces, that is, the first and second lens sub-surfaces 14 and 15 which correspond to partial curved surfaces of two kinds of original condenser lenses.

As shown in FIG. 2, the light beam is focused by the first lens sub-surface 14 of the condenser lens 13 to form a minute spot on a first optical disk 6 having a thin substrate thickness, and by the second lens sub-surface 15 to form a minute spot on a second optical disk 7 having a thick substrate thickness.

In one optical head, in this embodiment, the first and second lenses (lens sub-surfaces 14 and 15 of the condenser lens 13) can adapt to two kinds of optical disks having thin and thick substrate thicknesses.

In this embodiment, it is sufficient for the first and second lens surfaces 14 and 15 to constitute partial parts of the lens surfaces of the two original lenses, and a limitation such as a grating pitch of a holographic optical element in manufacturing is not required. Further, such an area split surface of the condenser lens can be readily produced by using not a conventional polished lens but a molded lens prepared using a metal mold.

In such an area split lens, as the number of the divided areas increases, that is, as each divided area decreases with respect to the lens opening, the focused spot grows more and more like the focused spot produced by the original lens.

Figure 3:
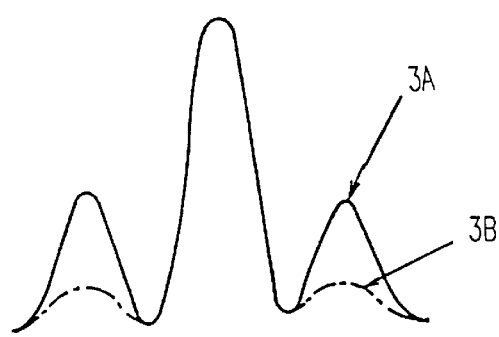
FIG. 3 is a schematic cross section showing an intensity distribution of a focused spot using a surface split lens whose surface is divided into a plurality areas in a concentric circle form, shown in FIGS. 3A and 3B, according to the present invention.

FIG. 3 shows an intensity distribution of a focused spot using a surface split lens whose surface is divided into a plurality sub-surfaces in a concentric circle form, and hatched parts show the same lens surfaces.

Figure 3A:
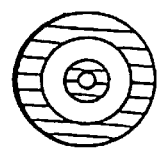
Figure 3B:
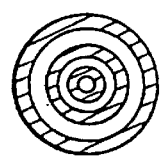

In the case of two areas (the divided number is four in FIG. 3A), large side robes occur, as shown by a solid line in FIG. 3, although no side robe problem is caused in the original lens. When the areas increases to three (the divided number is six in FIG. 3B), the side robes are considerably reduced, as shown by a one-dotted line in FIG. 3.

In an application to an optical head, it is considered that approximately 10% or less than 10% of the central beam as a side lobe height is an aim for practical use, and six or more is required as the number of the divided areas.

When an area dividing in a concentric circle form is carried out, the incident surface of the condenser lens having a rotation symmetry is divided into concentric annular areas, and the design can be readily implemented.

Figure 4:
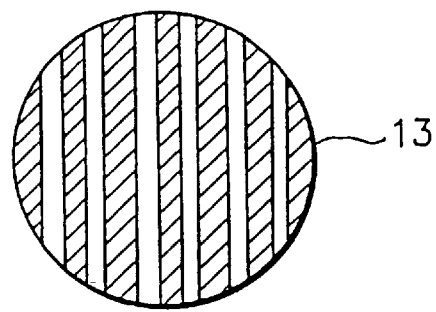
FIG. 4 is a schematic view showing an area division in a striped pattern according to the present invention.

When an area division of the lens surface is conducted in a striped pattern, as shown in FIG. 4, the boundaries of the divided areas become simple straight lines, and a cutting work of a metal mold can be readily performed using a precise bite.

However, in the case of the division in the striped pattern, when the divisional pitch is constant, the diffraction spot corresponding to this pitch is produced at an equal focal distance.

In such a case, the area division is carried out at not a constant pitch, and it is varied in a chirp form to change the curvature of the wave surface of the diffracted light, resulting in moving the focal point of the diffracted spot frontwards or rearwards in the light axis direction compared with that of the undiffracted spot. When the focal point position is different, the beam is spread and is blurred. As a result, no influence can be imparted to the recording and reproducing characteristics.

When the area division is executed with a random pitch instead of the chirping, the generation direction of the diffracted light is different within the lens, and a minute spot cannot be produced by the whole diffracted light. Hence, no actual problem occurs in the optical head.

Figure 5:
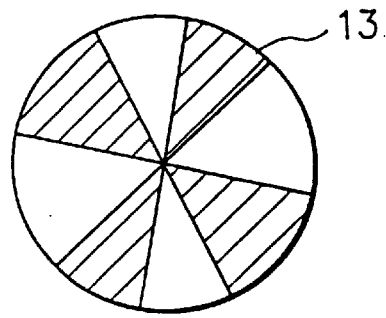
FIG. 5 is a schematic view showing an area division in a radial pattern according to the present invention.

An area division of the lens surface can be carried out in a radial pattern, as shown in FIG. 5.

Concerning a condenser lens, besides an infinite system lens to which the collimated light beam is incident, as shown in FIG. 2, a finite system lens using a focused light beam may be used on the laser light source side.

Further, a holographic lens composed of diffraction gratings can be used for one of the two lenses or both the lenses.

Figure 6:
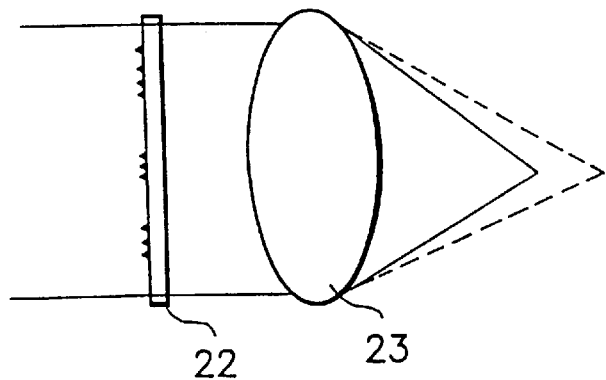
FIG. 6 is a schematic cross section of a condenser lens of an optical disk according to a second embodiment of the present invention.

FIG. 6 shows a condenser lens of an optical disk according to a second embodiment of the present invention. In this case, a partial holographic element 22 having holographic parts on its one surface is combined with a condenser lens 23. In the areas that the holographic parts are present, a combination of the holographic element 22 and the condenser lens 23 constitute a lens system, while in the areas having no holographic parts, only the characteristics of the condenser lens 23 are exhibited. Hence, the lens system is adaptable to two kinds of optical disks having thin and thick substrate thicknesses.

As described above, according to the present invention, a condenser lens for an optical head capable of being adaptable to two kinds of optical disks having different substrate thicknesses without limitation due to pitch of diffraction gratings can be implemented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A single condenser lens for use in an optical head capable of recording or reading information to or from optical disks having different substrate thicknesses by focusing a light beam emitted from a laser light source to form a plurality of minute spots along a common optical axis corresponding to the different substrate thicknesses, wherein one of the condenser lens surfaces comprises a plurality of lens sub-surfaces, each said sub-surface comprising multiple regions and each said sub-surface corresponding to a partially curved surface of a different condenser lens element, wherein in a front view of the single condenser lens the sub-surfaces are produced in a striped pattern and wherein a light beam is focused by a first sub-surface on an optical disk of a first substrate thickness and a light beam is focused by a second sub-surface on an optical disk of a second and differing substrate thickness.

2. The single condenser lens of claim 1, wherein the sub-surfaces are produced with a non-constant pitch.

* * * * *